(12) United States Patent
Harper

(10) Patent No.: US 7,660,076 B2
(45) Date of Patent: Feb. 9, 2010

(54) HELICAL GEAR ACTUATOR FOR TAPE DRIVE SYSTEMS

(75) Inventor: David Harper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/218,704

(22) Filed: Sep. 2, 2005

(65) Prior Publication Data

US 2007/0053111 A1  Mar. 8, 2007

(51) Int. Cl.
G11B 5/55 (2006.01)
(52) U.S. Cl. .................................. 360/261.3; 74/89
(58) Field of Classification Search .......... 360/261.3; 74/424.7, 84 R, 89
See application file for complete search history.

(56) References Cited

U.S. PATENT DOCUMENTS

| | | | | |
|---|---|---|---|---|
| 4,466,770 A | * | 8/1984 | Peroutky | 414/751.1 |
| 4,943,877 A | * | 7/1990 | Cannon et al. | 360/261.3 |
| 5,379,170 A | | 1/1995 | Schwarz | 360/109 |
| 5,450,257 A | * | 9/1995 | Tran et al. | 360/76 |
| 5,644,453 A | * | 7/1997 | Eckberg et al. | 360/261.3 |
| 5,647,707 A | * | 7/1997 | Poulin | 409/189 |
| 5,706,149 A | * | 1/1998 | Hoelsaeter | 360/261.3 |
| 5,793,574 A | * | 8/1998 | Cranson et al. | 360/261.3 |
| 6,003,394 A | | 12/1999 | Heckel, Jr. | 74/89.36 |
| 6,075,678 A | * | 6/2000 | Saliba | 360/291 |
| 6,331,920 B1 | | 12/2001 | Albrecht et al. | 360/63 |
| 6,437,946 B2 | * | 8/2002 | Todd | 360/261.1 |
| 6,556,385 B2 | * | 4/2003 | Nawa | 360/261.3 |
| 6,639,760 B2 | | 10/2003 | Dyer et al. | 360/261.3 |
| 6,697,230 B1 | * | 2/2004 | Nayak | 360/267.4 |
| 7,283,318 B2 | * | 10/2007 | Brooks et al. | 360/69 |
| 2003/0123195 A1 | | 7/2003 | Tamura et al. | 360/261.3 |

* cited by examiner

*Primary Examiner*—Jefferson Evans
(74) *Attorney, Agent, or Firm*—Zilka-Kotab, PC

(57) ABSTRACT

An actuator includes a leadscrew and a helical gear engaging the leadscrew, the helical gear having journals extending from opposite ends thereof. A carriage operatively engages the journals. A relative rotation between the leadscrew and the helical gear creates a relative movement between the carriage and the leadscrew in a direction parallel to an axis of the leadscrew.

18 Claims, 8 Drawing Sheets

HELICAL GEAR ACTUATOR FOR TAPE DRIVE SYSTEMS

FIELD OF THE INVENTION

The present invention relates to actuators for tape drive systems, and more particularly, this invention relates to a linear actuator having journals as actuator guides.

BACKGROUND OF THE INVENTION

Tape drives typically utilize an actuator mechanism to position the read/write head over the appropriate tracks while the tape is moving. Current read/write head positioning devices used in magnetic tape drives often incorporate a dual stage actuator design. One actuator provides coarse positioning to move the read/write head between data bands. The other actuator provides fine positioning to maintain alignment between the read/write head and the data tracks. In use, the coarse positioning actuator first moves the read/write head to the general vicinity of the data track on the tape and then the fine positioning actuator is used for track following while the tape is in motion. The two actuators may be mounted in a "piggyback" arrangement with the fine position actuator riding on the coarse position actuator.

The fine positioning actuator is typically a voice coil motor (VCM) mounted on the linear stage and held at a rest position by some type of spring. A VCM actuator provides micron to submicron precision positioning at a bandwidth of hundreds to thousands of hertz. However, a single voice coil and spring combination that can meet the fine positioning requirements across the full width of the tape is expensive and unnecessary. Accordingly, virtually all current tape drives use some combination of a coarse positioning actuator and a fine positioning actuator.

The coarse positioning actuator is typically a linear actuator driven by a stepper motor. Stepper motors have the ability to move the linear stage anywhere across the width of the magnetic tape at modest speeds.

Linear actuators have been designed where a motor drives a threadedly coupled nut (helical gear) which surrounds a corresponding threaded shaft (leadscrew). FIG. 1 depicts a typical helical gear actuator 100. As shown, a helical gear 102 is driven by a threaded shaft 104, which would be driven by a motor (now shown), such as a stepper motor. The helical gear 102 translates laterally as the threaded shaft 104 rotates, thereby carrying the housing body 110 along with it. Through the use of a bias spring (not shown), one end of the helical gear 102 is usually kept in contact with one end of one of the bushings 106, 108 to ensure positive axial retention while the actuator body 110 is being moved along the threaded shaft 104.

FIG. 2 illustrates a typical helical gear 102 as used in current tape drive systems. As shown, the helical gear 102 has a cylindrical shape and flat contact surfaces 202 that typically engage the bushings 106, 108 (FIG. 1) and/or bias spring. The contact surface 202 provides axial control of the actuator body 110, but very little radial control. Thus, some mechanism must be present to avoid wobble of the actuator body 110 relative to the threaded shaft 104.

With continued reference to FIG. 1, the bushings 106, 108 are designed to engage the threaded shaft 104 in order to reduce wobbling. More particularly, each bushing 106, 108 is coincident with the threaded shaft 104, using the outer diameter of the threaded shaft 104 as the datum for proper alignment of the threaded shaft 104 relative to the helical gear 102.

One problem with using the outer diameter of the threaded shaft as the alignment datum is that the threaded outer surface of the threaded shaft is not uniform. Rather, varying thread height results in a varying axial sliding interface as the actuator bushings slide along the outer diameter of the threaded shaft. This can translate into inconsistent coarse motion of the actuator assembly.

In addition, a recurring problem with using bushings is that the bushings, which contact the rotating threaded shaft, tend to wear and create particles. If the threads have minor defects or are non uniform, the threads of the screw can act as a saw on the bushings. The resultant particles have been found to interfere with operation of the actuator. Particularly, the particles tend to accumulate in the actuator, causing it to lose response time and even completely stop functioning in some systems. Further, as the bushings are worn away, wobbling or radial play increases.

Therefore, there is a need to eliminate problems with the guide bushing-to-threaded fastener interface, such as, but not limited to, wear between the bushing inner diameter and threaded shaft outer diameter as a result of axial sliding over an inconsistent surface, and inconsistent coarse motion of the actuator assembly as a result of variations in the thread peaks along the axial length of the threaded shaft.

SUMMARY OF THE INVENTION

To overcome the aforementioned disadvantages, an actuator according to one embodiment includes a leadscrew. A helical gear having journals extending from opposite ends engages the leadscrew. A carriage operatively engages the journals. A relative rotation between the leadscrew and the helical gear creates a relative movement between the carriage and the leadscrew in a direction parallel to an axis of the leadscrew. Utilizing the helical gear journals and actuator bushings as the guiding mechanism for coarse motion eliminates the need to use bushings that slide on the outer diameter of a leadscrew as a guide datum and the problems inherent with such systems.

In some embodiments, the journals are integrally formed on the helical gear. In other embodiments, the journals are individual parts coupled to the helical gear. Further embodiments include combinations of integral and individual journals. The journals may or may not include internal threads adapted to engage the leadscrew.

In one embodiment, the carriage includes a pair of apertures through which the leadscrew extends, the journals being positioned in the apertures. Bushings are preferably positioned in the apertures of the carriage, and the outer peripheries of the journals engage the inner surfaces of the bushings.

A motor, preferably a stepper motor, effects the relative rotation of the leadscrew and helical gear.

A tape drive actuator generally includes a coarse positioner as described above and a fine positioner, e.g., VCM, coupled to at least one of the carriage and the leadscrew.

The actuators described herein are useful in many systems, and have particular applicability to actuating a tape head in a tape drive system. Such tape drive systems may include a head, an actuator assembly as recited above for actuating the head, a drive mechanism for passing a magnetic recording tape over the head, and a controller in communication with the actuator.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

BEST MODE FOR CARRYING OUT THE INVENTION

Figure 1:
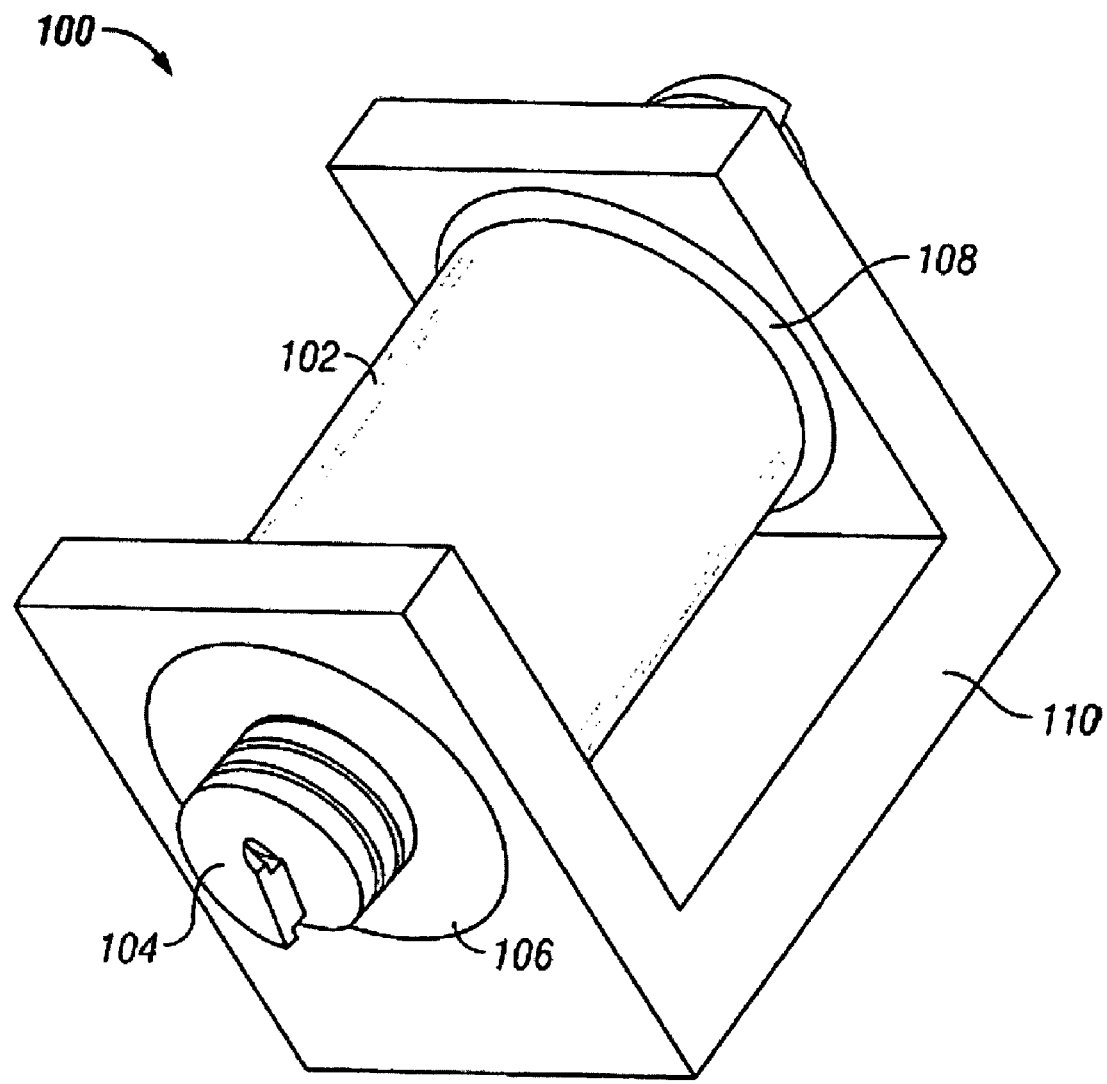
FIG. 1 is a perspective view of an actuator.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The following description discloses a unique actuator configuration utilizing a helical gear on a leadscrew as a guide datum for coarse motion actuation, e.g., within a tape drive. Utilizing the helical gear journals and actuator bushings as the guiding mechanism for coarse motion eliminates the need to use bushings that slide on the outer diameter of a leadscrew as a guide datum. This unique proposal describes a more robust interface than when using the leadscrew as a guide datum to move an actuator. The interface proposed here is a consistent sliding surface interface versus the varying sliding interface of traditional designs, e.g., across the threads of the leadscrew. Accordingly, the embodiments described herein eliminate several problems with the guide bushing to leadscrew interface, such as, but not limited to, wear between the bushing inner diameter and leadscrew outer diameter as a result of axial sliding over an inconsistent surface, and inconsistent coarse motion of the actuator assembly as a result of variations in the thread peaks along the axial length of the leadscrew.

Figures 2, 3:
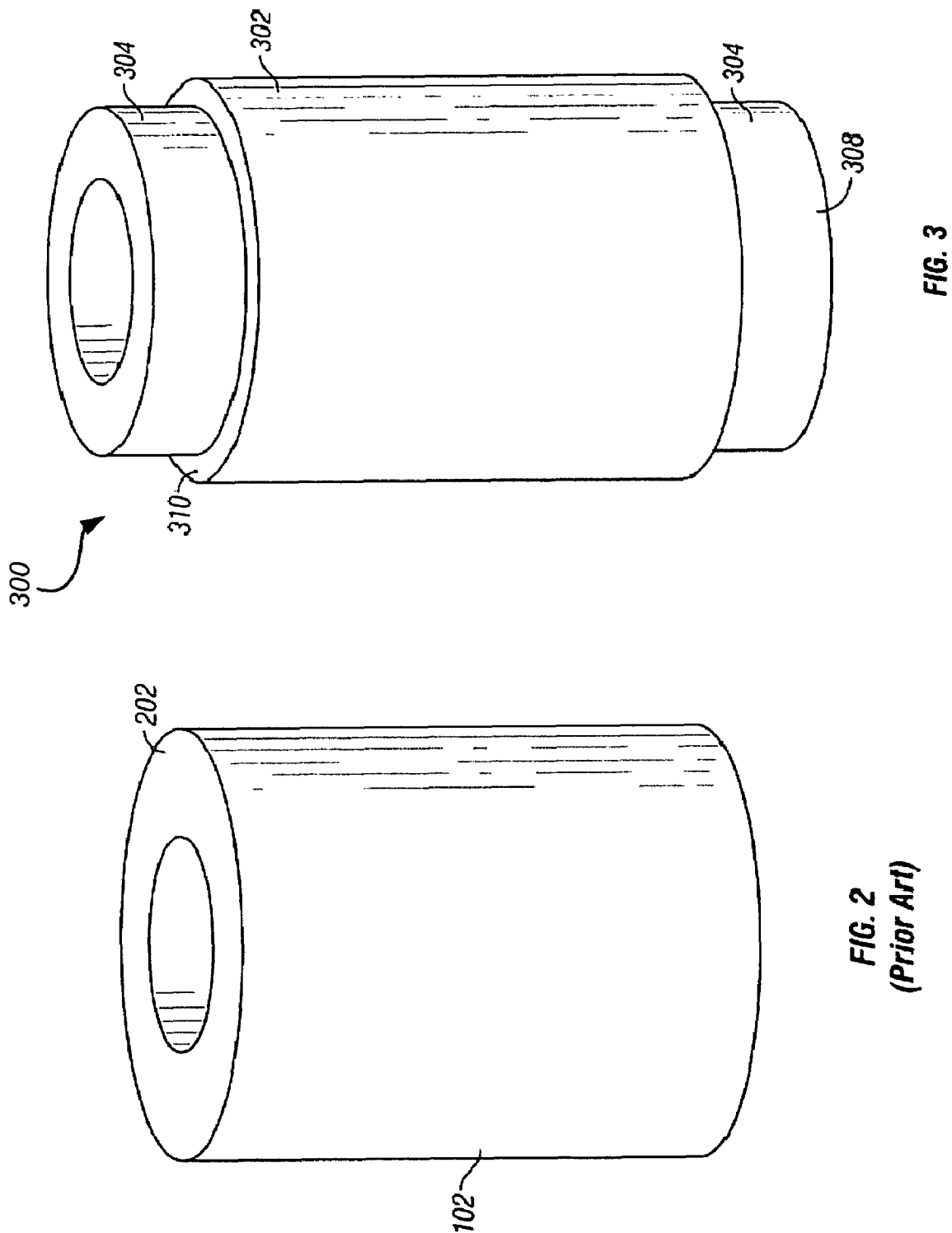
FIG. 2 is a perspective view of a helical gear.
FIG. 3 is a perspective view of a helical gear with journals according to one embodiment.

FIG. 3 illustrates a helical gear 300 according to one embodiment of the present invention. As shown, the helical gear has a main portion 302 and journals 304 extending from ends thereof.

Figure 4:
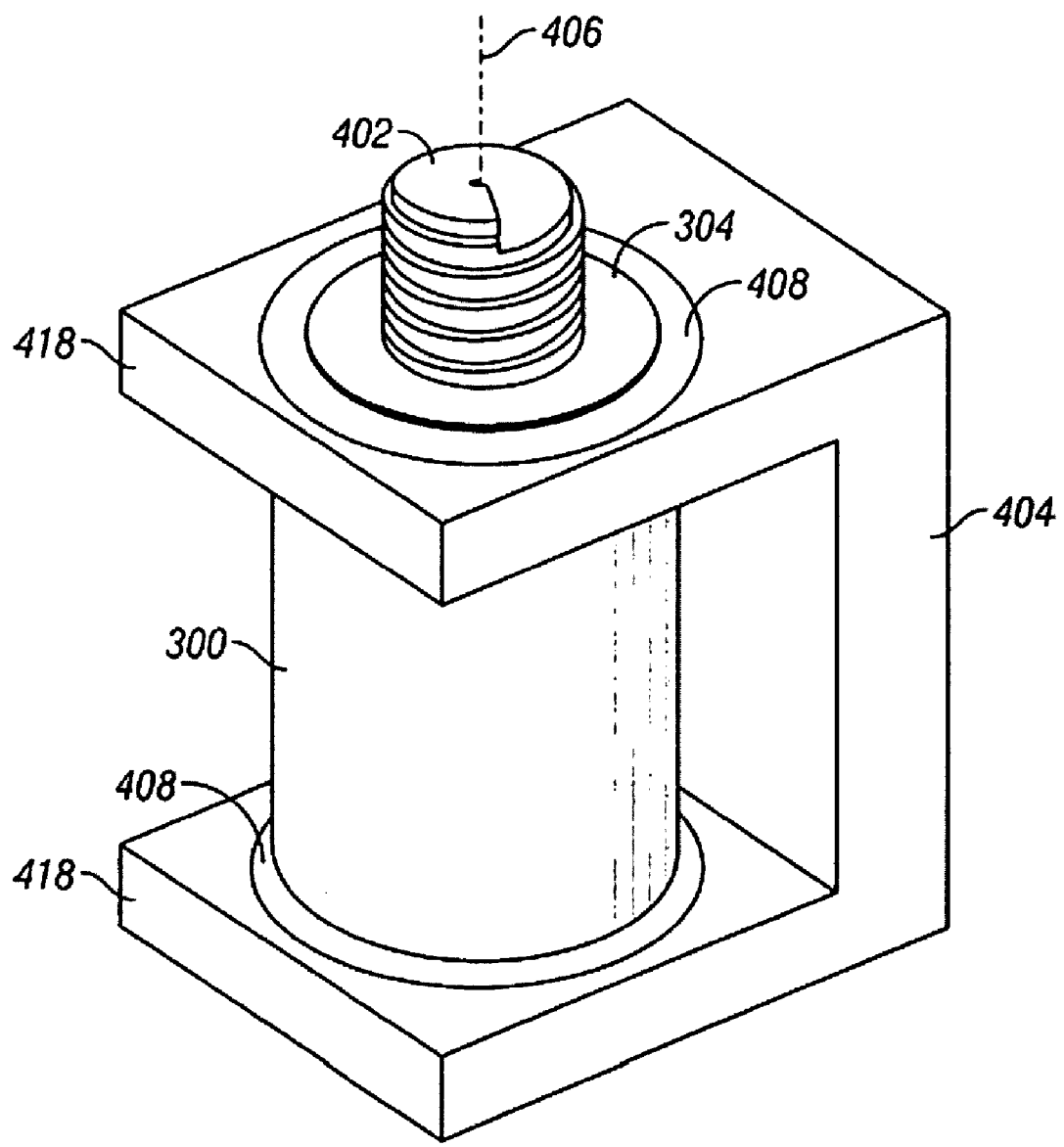
FIG. 4 is a perspective view of an actuator according to one embodiment.

FIG. 4 depicts an actuator 400 implementing the helical gear 300 of FIG. 3. With continued reference to FIG. 4, the helical gear 300 engages a leadscrew 402 such that a relative rotation between the leadscrew 402 and the helical gear 300 cause relative movement between the helical gear 300 and the leadscrew 402 parallel to the longitudinal axis 406 of the leadscrew 402.

The helical gear 300 operatively engages a carriage 404 such that the carriage 404 exhibits the same linear movement as the helical gear 300 relative to the leadscrew 402. The carriage 404 includes a pair of arms 418 that flank the helical gear 300. Each of the arms 418 may include an annular bushing 408 that encircle and engage the journals 304.

As mentioned above, the helical gear 300 has journals 304 extending from its ends. By using a longer helical gear 300 with two sections that act as journals 304 for the carriage 404 itself or bushings 408 coupled to the carriage 404, the position of the carriage 404 in the radial direction is still maintained by the leadscrew axis 406 and thread pitch diameter, but the sliding interface is formed between the outer periphery 308 (FIG. 3) of the journal 304 and the inner surface of the bushing 408.

Axial play can be controlled by the horizontal surface 310 (FIG. 3) on one end of the helical gear 300. By maintaining concentricity between the journal centers and the helical gear pitch diameter center during fabrication of the helical gear 300, radial run-out as the helical gear 300 rotates can be minimized. This is desirable, as radial run-out causes such things as wobbling, uneven wear on the slidably engaging parts, etc. Concentricity between the helical gear 300 inner pitch diameter relative to the journal outer diameter is easier to maintain than thread peak consistency along the length of the leadscrew 402. In addition, there are no sensitive surface finishes, or corner breaks of the leadscrew thread peaks themselves that engage the bushings 408 coupled to the carriage 404. Traditional designs are dependent upon consistent surface quality of the leadscrew thread peaks for proper function. In contrast, the bushings 408 and journals 304 of the present invention can be machined using turning operations, which tend to be more precise than molding. The precise matching of the engaging surfaces of the bushings 408 and journals 304 enabled by the present invention creates a consistent sliding surface interface. Accordingly, the embodiments disclosed herein have the advantage of eliminating the varying axial sliding interface as the actuator bushings slide on the outer diameter of the leadscrew 402 and instead uses a constant rotary sliding interface between more tightly controllable surfaces, i.e., the journals and bushings.

The leadscrew 402 may be a threaded shaft, or may be a shaft having other types of protrusions and/or channels. The helical gear 300 has complementary internal threads or other complementary protrusions/channels to effect the relative movement. For clarity, the description herein assumes that the leadscrew 402 is a threaded shaft and the helical gear 300 has a complementarily threaded interior surface.

The journals 304 may be formed as an integral part of the helical gear 300. For instance, part of or the entire helical gear 300 may be injection molded of plastic. In a variation, metal ends of the helical gear 300 may be machined to form the journals 304. Similarly, ceramic ends of the helical gear 300 may be molded to form the journals 304. Durable materials such as metal and ceramic are preferred to maximize durability.

In other embodiments, the journals 304 are individual parts that are coupled to the helical gear 300. For example, the journals 304 may be cylindrical members of the same or different material than the helical gear 300 or bushings 408.

In further embodiments, a journal 304 on one end of the helical gear 300 can be integral to the helical gear 300, and the journal 304 on the other end can be added as a separate part. This embodiment may be useful during assembly of the actuator, as clearances in the carriage 404 may require the helical gear 300 to be assembled therein.

The journals 304 may be identical parts. In other permutations, the journals 304 may have varying inner and outer diameters, varying axial lengths, etc. The journals 304 need not have threaded interiors, but may feature threading on the inner diameters thereof that complement the threading of the leadscrew 402. Threading the inner surfaces of the journals 304 further eliminates the sliding interface over the threads of the leadscrew 402, thereby ensuring smooth movement of the helical gear 300 and carriage 404 relative to the leadscrew 402.

Figure 5A:
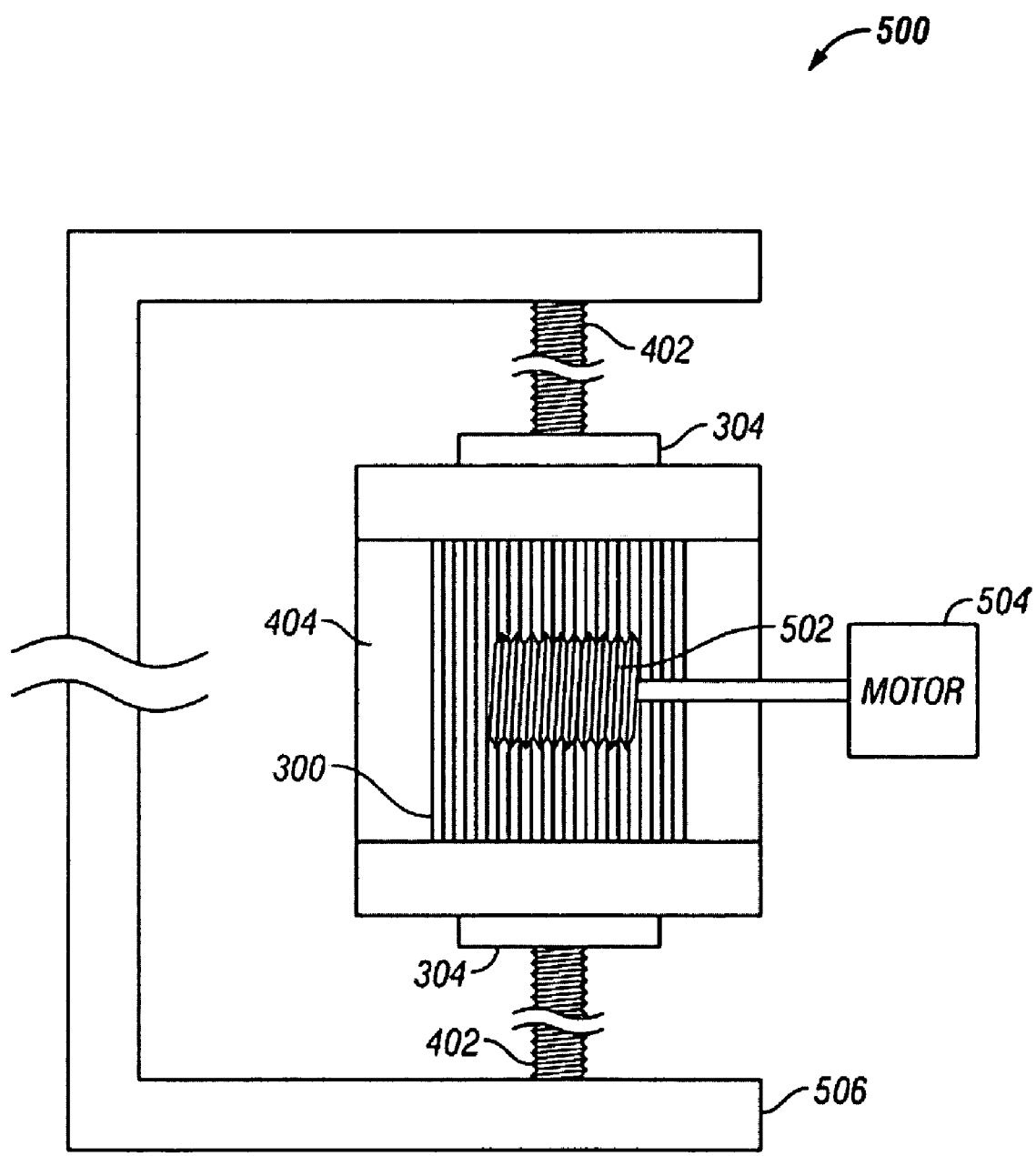
FIG. 5A is a partial side view of an actuator according another embodiment.

The journals 304 may be about flush with the outer surface of the bushings 408, as shown in FIG. 4. However, one or more of the journals 304 may be recessed slightly from full axial-length engagement with the bushing 408, or protrude past the bushing 408, as shown in FIG. 5A. An advantage of flush or protruding journals 304 is that the engaging surfaces of the two parts are at their maximum, so the wear on the parts is minimized.

Illustrative materials for the journals 304 include plastic, ceramic, metal, and combinations thereof. One illustrative material is aluminum with an anodized coating.

A preferred material for the bushings 408 is bronze or other metal into which lubricant can be impregnated, though ceramics and plastics are suitable for many applications. One practicing the teachings herein should consider effects such as coefficients of thermal expansion, durability, etc. when selecting materials for the bushings 408 and journals 304.

With continued reference to FIG. 4, one illustrative method to assemble the actuator 400 where the arms 418 of the carriage 404 are rigid is to adhere the bottom journal 304 to the helical gear 300 main portion (if the journal is a separate piece). The bottom journal 304 of the helical gear 300 is inserted in the bottom bushing 408, and the top of the helical gear 300 is aligned with the aperture in the top arm of the carriage 404, where the bushing 408 is not yet installed in the top arm. The top journal 304 is coupled to the top of the main portion of the helical gear 300. Then the top bushing 408 is installed in the top arm of the carriage 404. The journals 304 and/or bushings 408 can be press fit, where its outer diameter is slightly larger than the diameter of the receiving aperture. The journals 304 and/or bushings 408 are thus held in place by friction. These parts can also be fixed with an adhesive, attached with fix screws, etc.

If the arms 418 of the carriage are resiliently deformable or detachable, the arms 418 can be separated enough to allow entry of the already-formed or assembled helical gear 300 therebetween. The arms 418 are then released or attached, thereby engaging the helical gear 300.

FIG. 5A illustrates an embodiment 500 where the helical gear 300 is driven by a worm gear 502, which is in turn driven by a motor 504, such as a stepper motor. This type of embodiment 500 is preferred where a low overall actuator profile is desired. If the carriage 404 is fixed, the leadscrew 402 will move up and down as the motor 504 rotates the helical gear 300. Note that the leadscrew 402 would be rotationally fixed by its mount 506. The mount 506 can then be coupled (or be part of) to an object to be actuated, such as a fine positioner for a tape drive. If the leadscrew 402 is axially fixed (does not move along its axis) and rotationally fixed, the carriage 404 is carried along by the rotating helical gear 300. Through the use of a bias spring (not shown), one end of the helical gear 300 can be kept in contact with one end of one of the bushings 408 to ensure positive axial retention while the carriage 404 is moving relative to the leadscrew 402.

Figure 5B:
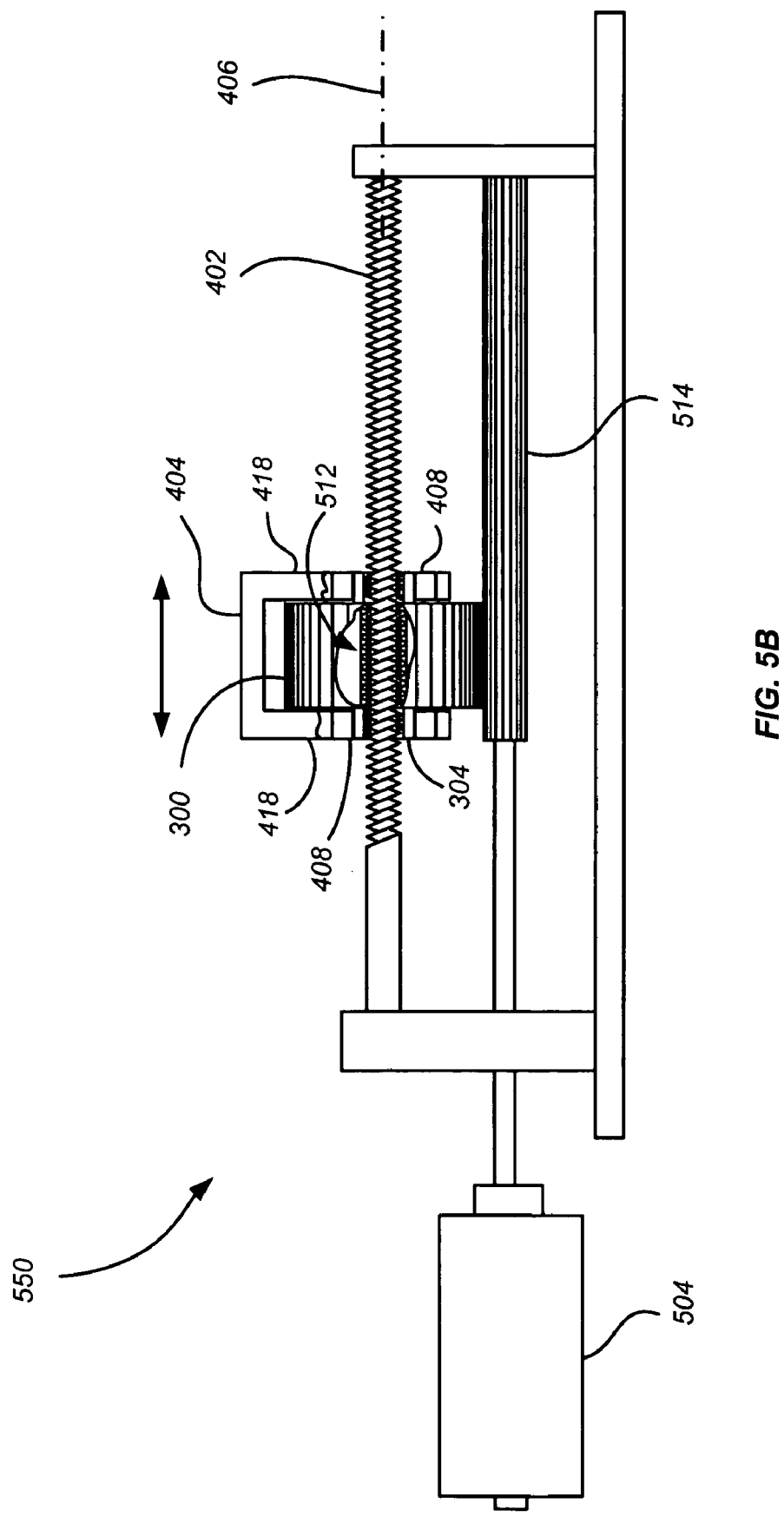
FIG. 5B is a partial cutaway side view of an actuator according to yet another embodiment.

FIG. 5B illustrates another embodiment 550 where the motor 504 rotates the helical gear 300. In this embodiment, the helical gear 300 has internal threads 512 that engage the leadscrew 402. The threads 512 can be integral as shown, or can be formed in a nut (not shown) coupled to the helical gear 300. The relative rotation is created when the helical gear 300 is rotated by an external gear 514 coupled to the drive motor 504 and engaging the helical gear 300. As the helical gear 300 rotates about the fixed leadscrew 402, it moves along the leadscrew 402, pushing the rest of the carriage 404 therewith.

As mentioned above, the actuators described herein are particularly useful as coarse positioning actuators in a tape drive. Again, tape drives typically utilize a dual stage actuator system to position the read/write head over the appropriate tracks while the tape is moving. One actuator provides coarse positioning to move the read/write head between data bands. The other actuator provides fine positioning to maintain alignment between the read/write head and the data tracks. In use, the coarse positioner first moves the read/write head to the general vicinity on the tape and then the fine actuator is used for track following while the tape is in motion. The two actuators are usually mounted in a "piggyback" arrangement with the fine position actuator riding on the coarse position actuator.

The coarse positioning actuator is typically a linear stage driven by a stepper motor. Stepper motors have the ability to move the linear stage anywhere across the width of the magnetic tape at modest speeds, yet can be relatively precisely controlled by controlling the number of "steps", or partial rotations, taken by the motor. However, most stepper motors lack the accuracy and bandwidth necessary to maintain alignment between the read/write head and the data tracks as the magnetic tape moves across the face of the read/write head.

The fine positioning actuator is typically a voice coil motor (VCM) mounted on the linear stage and held at a rest position by some type of spring. A voice coil actuator provides micron to submicron precision positioning at a bandwidth of hundreds to thousands of hertz.

Figure 6:
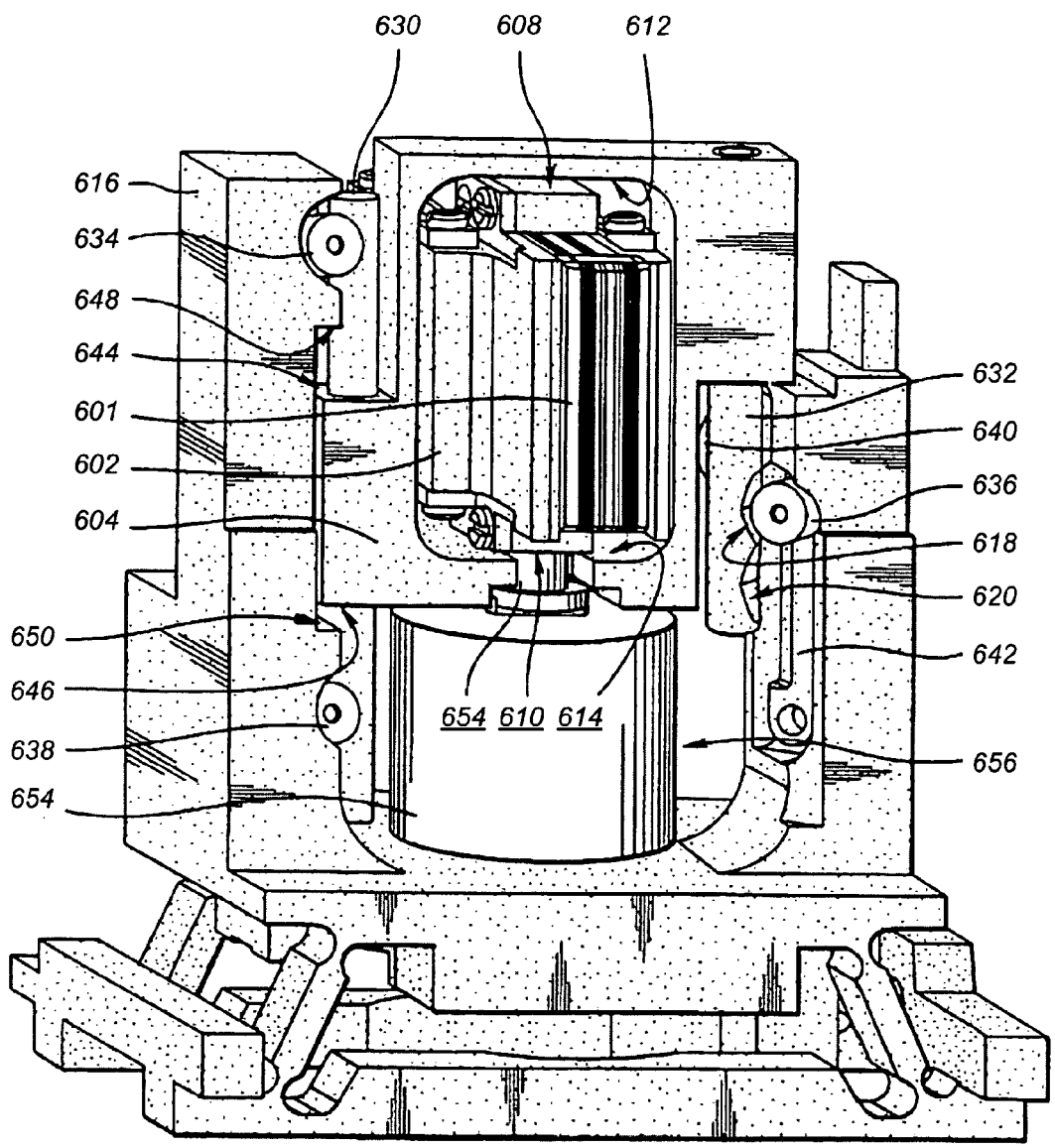
FIG. 6 is a perspective view of a coarse positioning actuator implemented in a tape drive system as seen from the tape medium side.

FIG. 6 is a perspective view of a coarse positioning actuator implemented in a tape drive system as seen from the tape medium (not shown) side. The basic mechanics of this embodiment are similar to that shown in FIGS. 4 and 5B. This embodiment allows for transducer movement between data bands on the order of fifty to one hundred milliseconds, and a fine positioning bandwidth on the order of six hundred hertz.

Referring to FIG. 6, the transducer (tape head) 601 is mounted on the carriage 602. A resilient member (not shown) connects the carriage 602 to a moving frame 604. The resilient member can include flexures (not shown) made of thin metal strips that allow the carriage 602 to be displaced laterally (as defined by the tape medium) but not longitudinally with respect to the moving frame 604. Mechanical stops 608 and 610 are the top and bottom surfaces respectively of the carriage 602. Stop abutments 612 and 614 are inside surfaces of the moving carriage 604 opposite the mechanical stops 608 and 610 respectively.

The moving frame 604 slides relative to the fixed frame 616 on two rails 630 and 632 are guided by several guide bearings 634, 636, 638, 640. These guide bearings are rotatably mounted to the fixed frame 616. One of the bearings 636 is attached to the fixed frame 616 by a load arm 642 and acts as both a guide bearing and the click. Two detent notches 618 and 620 in rail 632 define two discrete positions for coarse positioning of the transducer 601.

Additional mechanical stops 644 and 646 and stop abutments 648 and 650 are defined on surfaces of the moving frame 604 and fixed frame 616 respectively. The mechanical stops 644-646 and the stop abutments 648-650 mechanically limit the range of motion of moving frame 604 with respect to the fixed frame 616. This keeps the rails 630 and 632 in contact with the guide bearings 634-640 and the guide/click bearing 636.

A motor 656 rotates the helical gear (not shown) of the actuator that in turn causes movement of the carriage 602 in a manner similar to that described with reference to FIGS. 4 and 5B.

Figure 7:
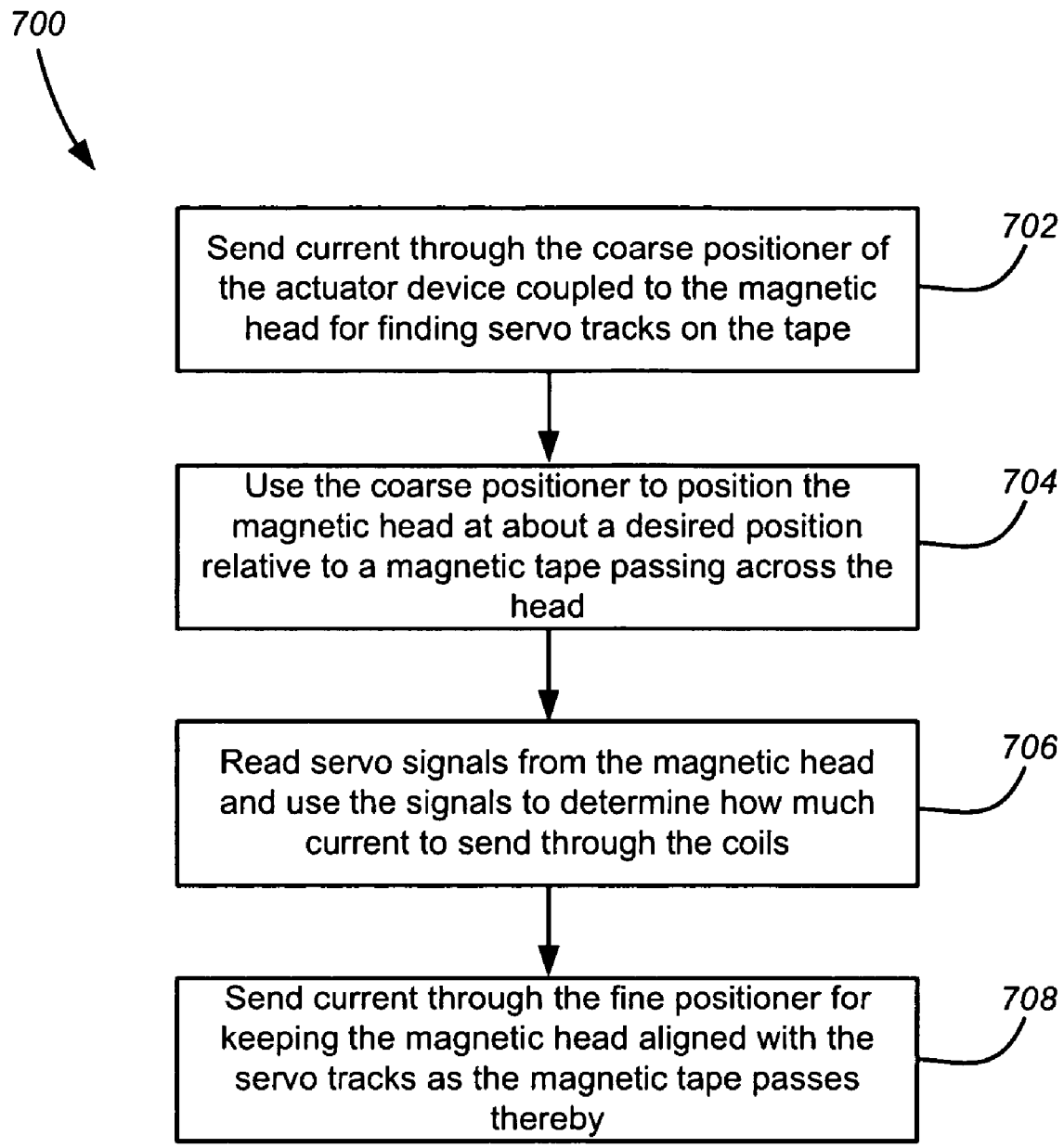
FIG. 7 illustrates a method for positioning a tape head relative to a tape.

FIG. 7 depicts a method 700 for positioning a magnetic tape head relative to a tape. In operation 702, a current is sent through a coarse positioning actuator coupled to the magnetic head for finding servo tracks on the tape. In operation 704, the coarse positioner is used to position the magnetic head at about a desired position relative to a magnetic tape passing across the head. In operation 706, servo signals are read from the magnetic head and used to determine how much current to send through the coils. In operation 708, a current is sent through the fine positioner for keeping the magnetic head aligned with the servo tracks as the magnetic tape passes thereby.

Figure 8:
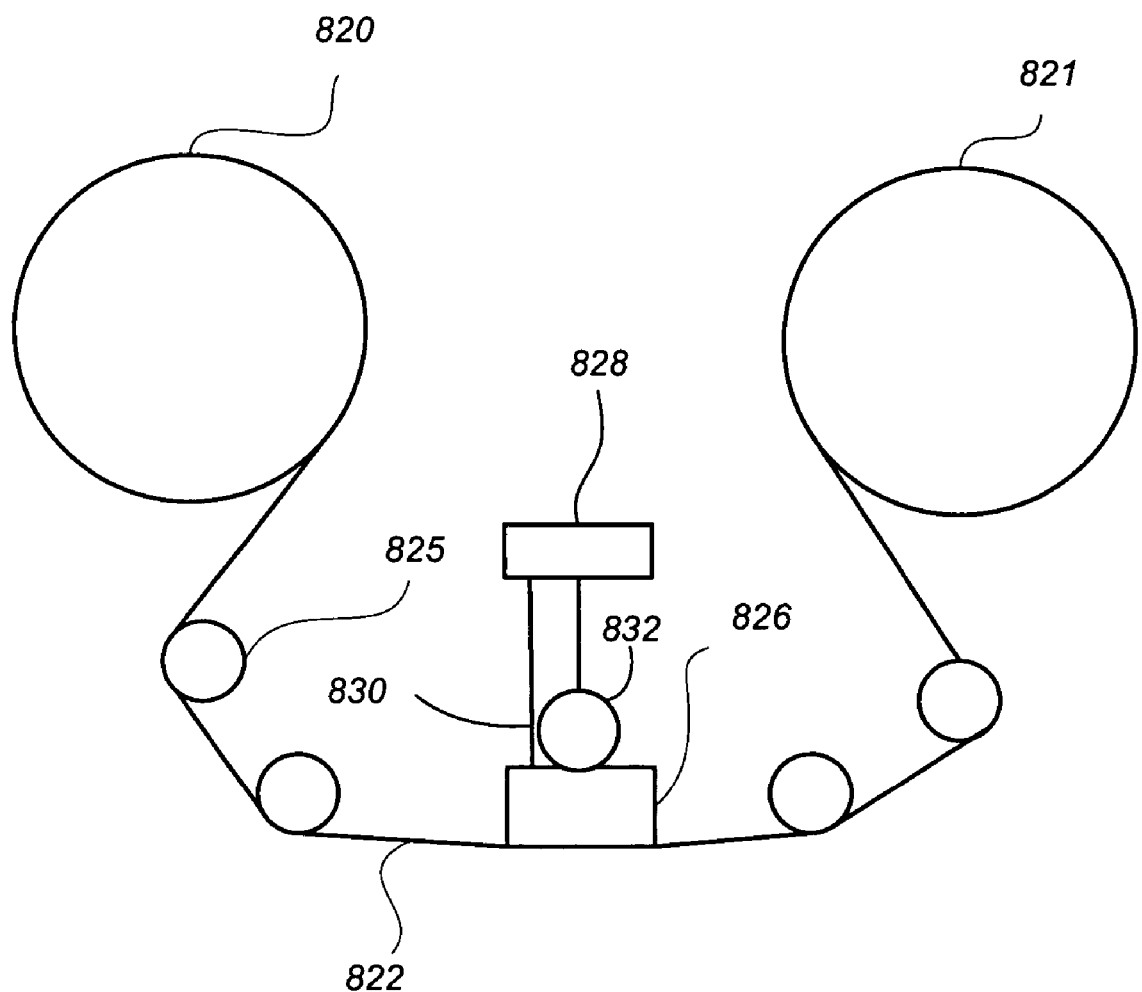
FIG. 8 illustrates a tape drive which may be employed in the context of the method of FIG. 7.

FIG. 8 illustrates a tape drive which may be employed in the context of the method 700 of FIG. 7. While one specific implementation of a tape drive is shown in FIG. 8, it should be noted that the embodiments of the previous figures may be implemented in the context of any type of drive (i.e. hard drive, tape drive, etc.)

As shown, a tape supply cartridge 820 and a take-up reel 821 are provided to support a tape 822. Moreover, guides 825 guide the tape 822 across a bidirectional tape head 826. Such bidirectional tape head 826 is in turn coupled to a controller assembly 828 via a compression-type MR connector cable 830. The actuator 832 controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host to send and receive the data and for controlling the operation of the tape drive and communicating the status of the tape drive to the host, all as understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An actuator, comprising:
   a leadscrew;
   a helical gear engaging the leadscrew, the helical gear having journals extending from opposite ends thereof; and
   a carriage operatively engaging the journals such that a sliding interface is formed therebetween, wherein a relative rotation between the leadscrew and the helical gear creates a relative movement between the carriage and the leadscrew in a direction parallel to an axis of the leadscrew,
   wherein the journals and the helical gear are formed as a single contiguous piece.

2. An actuator as recited in claim 1, wherein the journals are individual parts coupled directly to the helical gear.

3. An actuator as recited in claim 1, wherein the journals include internal threads adapted to engage the leadscrew.

4. An actuator as recited in claim 1, further comprising a tape head coupled to the carriage, the journals being nonrotatably coupled directly to the ends of the helical gear, wherein the carriage directly engages the journals such that a sliding interface is formed between the journals and the carriage.

5. An actuator as recited in claim 1, wherein the leadscrew is axially fixed, wherein the carriage moves along the axis of the leadscrew upon rotation of the helical gear.

6. A tape drive system, comprising:
   a head;
   an actuator as recited in claim 1 coupled to the head;
   a drive mechanism for passing a magnetic recording tape over the head; and
   a controller in communication with the actuator.

7. An actuator, comprising:
   a leadscrew;
   a helical gear engaging the leadscrew, the helical gear having journals extending from opposite ends thereof; and
   a carriage operatively engaging the journals such that a sliding interface is formed therebetween, wherein a relative rotation between the leadscrew and the helical gear creates a relative movement between the carriage and the leadscrew in a direction parallel to an axis of the leadscrew,
   wherein the carriage includes a pair of apertures through which the leadscrew extends, the journals being positioned in the apertures of the carriage between the leadscrew and the carnage such that the leadscrew does not engage the carriage in the vicinity of the journals.

8. An actuator as recited in claim 7, further comprising bushings positioned in the apertures of the carriage, outer surfaces of the journals engaging inner surfaces of the bushings.

9. An actuator, comprising:
   a leadscrew;
   a helical gear engaging the leadscrew, the helical gear having journals extending from opposite ends thereof; and
   a carriage operatively engaging the journals such that a sliding interface is formed therebetween, wherein a relative rotation between the leadscrew and the helical gear creates a relative movement between the carriage and the leadscrew in a direction parallel to an axis of the leadscrew,
   wherein the carnage is axially fixed and the leadscrew moves along the axis thereof upon rotation of the helical gear.

10. A tape drive actuator, comprising:
    a first positioner, comprising:
       a leadscrew;
       a helical gear engaging the leadscrew, the helical gear having journals extending from opposite ends thereof; and
       a carriage operatively engaging the journals such that a sliding interface is formed therebetween, wherein a relative rotation between the leadscrew and the helical gear creates a relative movement between the carriage and the leadscrew in a direction parallel to an axis of the leadscrew; and
    a second positioner coupled to at least one of the carriage and the leadscrew,
    wherein the journals and the helical gear are formed as a single contiguous piece.

11. An actuator as recited in claim 10, wherein the journals are individual parts coupled directly to the ends of the helical gear.

12. An actuator as recited in claim 10, wherein the journals include internal threads adapted to engage the leadscrew.

13. An actuator as recited in claim 10, further comprising a motor operatively coupled to the helical gear for rotating the helical gear.

14. A tape drive system, comprising:
a head;
an actuator as recited in claim 10 coupled to the head;
a drive mechanism for passing a magnetic recording tape over the head; and
a controller in communication with the actuator.

15. An actuator, comprising:
a leadscrew;
a cylindrical helical gear engaging the leadscrew, the helical gear having cylindrical journals extending from opposite ends thereof; and
a carriage having arms, each arm having a bushing coupled thereto, the journals rotatably engaging inner surfaces of the bushings,
a motor for creating a relative rotation between the leadscrew and the helical gear, thereby creating a relative movement between the carriage and the leadscrew in a direction parallel to an axis of the leadscrew.

16. An actuator as recited in claim 15, wherein the journals are integrally formed on the helical gear.

17. An actuator as recited in claim 15, wherein the journals are individual parts coupled to the helical gear.

18. An actuator as recited in claim 15, wherein the journals include internal threads adapted to engage the leadscrew.

* * * * *

UNITED STATES PATENT AND TRADEMARK OFFICE
CERTIFICATE OF CORRECTION

| | |
|---|---|
| PATENT NO. | : 7,660,076 B2 |
| APPLICATION NO. | : 11/218704 |
| DATED | : February 9, 2010 |
| INVENTOR(S) | : David Harper |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Thirtieth Day of November, 2010

David J. Kappos
*Director of the United States Patent and Trademark Office*